May 20, 1941.    L. S. HAMER    2,242,467
ORIFICE PLATE OR LINE BLIND
Filed Dec. 20, 1939
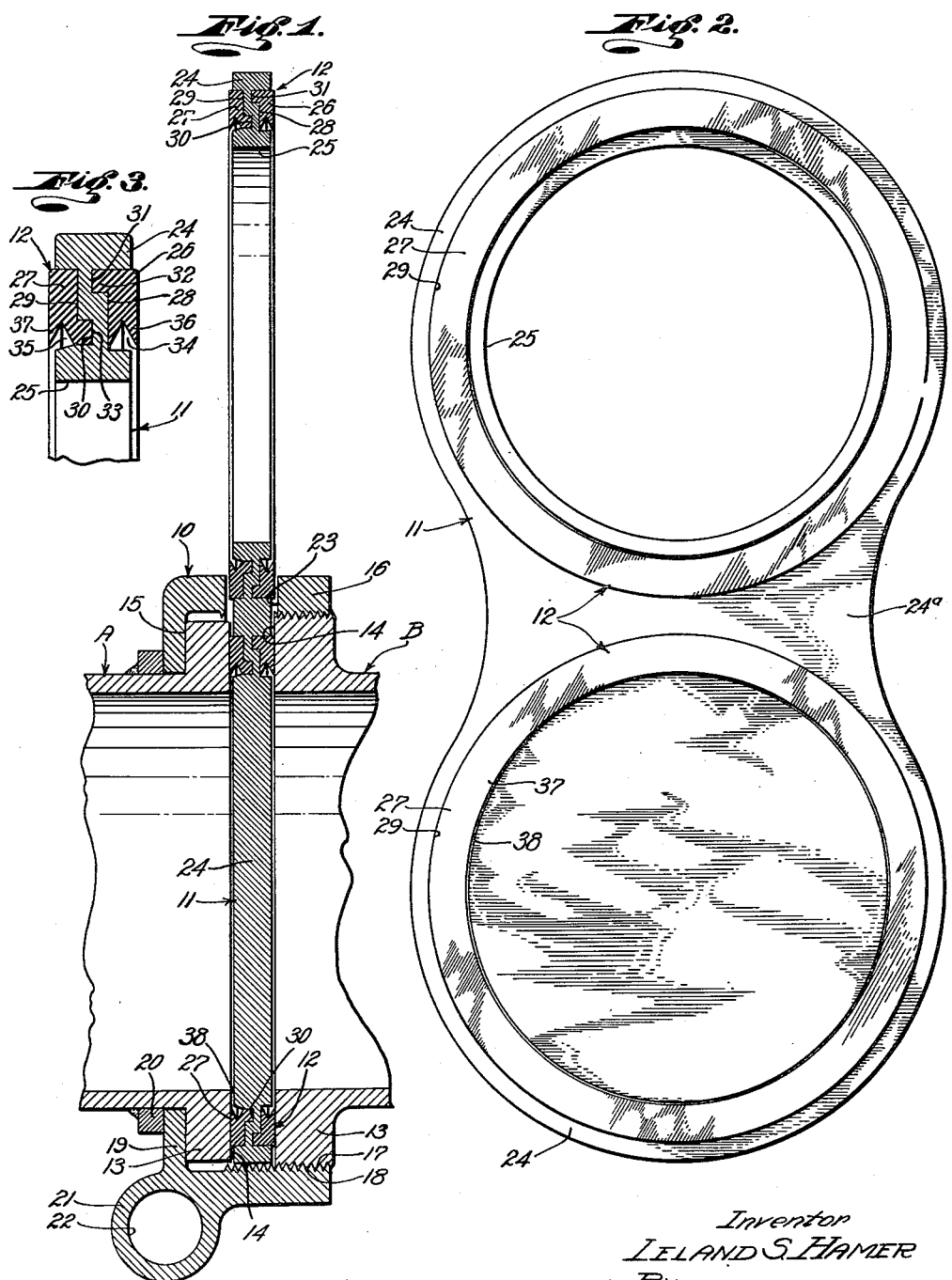
Inventor
LELAND S. HAMER
By
His Attorney Patented May 20, 1941

2,242,467

UNITED STATES PATENT OFFICE 2,242,467

ORIFICE PLATE OR LINE BLIND

Leland S. Hamer, Long Beach, Calif.

Application December 20, 1939, Serial No. 310,183

2 Claims. (Cl. 251—159)

This invention relates to flow controlling devices and relates more particularly to orifice plates and line blind plates. A general object of this invention is to provide an orifice plate or line blind embodying novel, practical and very effective sealing means.

Another object of this invention is to provide an orifice plate or line blind plate embodying sealing elements actuated by both mechanical pressure and fluid pressure.

Another object of this invention is to provide an orifice plate or line blind plate having a sealing element that may be compressed or actuated by mechanical pressure to provide a dependable fluid tight seal with the fitting or body and while so actuated may be further expanded or actuated by the fluid pressure in the line to dependably resist all increase in such fluid pressure.

Another object of this invention is to provide an orifice plate or line blind plate of the character mentioned in which the sealing elements are set in the opposite sides of the plate and are shaped and related to be of maximum thickness without unduly weakening the plate and without necessitating an increase in the thickness of the plate.

Another object of this invention is to provide an orifice plate or line blind of the character mentioned that is simple and inexpensive and in which the sealing elements may be readily replaced.

Another object of this invention is to provide a fitting or line blind embodying a plate of the character above referred to and having means for simultaneously mechanically compressing the sealing elements on opposite sides of the plate to provide fluid seals at both sides of the plate without resorting to the use of expensive and inaccessible sealing means on the fitting or body.

A further object of this invention is to provide a fitting or line blind embodying a plate or closure having perforate and imperforate parts with sealing elements on opposite surfaces of both parts and means for subjecting either set of sealing elements to mechanical pressure while allowing the fluid pressure in the line to act on the sealing elements to assure effective actuation of the sealing elements by both mechanical and fluid pressures.

The various objects and features of my invention will be fully understood from the following detailed description of a typical preferred form and application of the invention, throughout which description reference is made to the accompanying drawing, in which:

Fig. 1 is a longitudinal fragmentary detailed sectional view of the device of this invention with the imperforate part of the plate in position across the fluid passage. Fig. 2 is a side elevation of the plate removed from the fitting or body and Fig. 3 is an enlarged fragmentary detailed sectional view of the plate illustrating one set of sealing rings.

The device of the present invention may be said to comprise, generally, two tubular sections A and B to be connected in a pipe line or the like, means 10 for moving the sections toward and away from one another, a blind or plate 11 to be inserted between the sections A and B, and sealing means 12 on the plate 11 for sealing with the opposing ends of the sections A and B.

The fitting sections or body sections A and B are tubular parts arranged in end to end relation and adapted to be connected in a conduit or pipe line to form a part of the same. The sections A and B may be straight tubular parts of the same diameter and may be rigidly secured to spaced elements of the pipe line not shown in a selected or preferred manner. An annular external flange 13 is provided on the inner end of each section A and B. The ends of the flanges 13 are flush with the inner ends of the sections A and B so that the sections present opposing end surfaces 14 of substantial area. The surfaces 14 are flat and parallel and are preferably normal to the common longitudinal axis of the sections. The surfaces 14 constitute sealing faces and are finished and smooth. The outer end 15 of the flange 13, carried by the section A, is preferably flat and normal to the longitudinal axis of the section.

The means 10 is operable to move the opposed sections A and B toward and away from one another to clamp the plate 11 in its operative position and to permit ready removal of the plate. The means 10 comprises a ring or sleeve 16 arranged about or surrounding the flanges 13 of the sections A and B. The sleeve 16 surrounds the flange 13 of the section A with substantial clearance and has an internal thread 17 for mating with an external thread 18 on the flange 13 of the section B. The threads 17 and 18 are heavy and preferably of substantial pitch. The sleeve 16 is freely turnable on the section A but is held against longitudinal movement relative to the section A so that cooperation of the threads 17 and 18 may move the sections A and B toward and away from one another. The sleeve 16 is provided with an inwardly projecting annular lip 19 for engaging with the flange end 15. A ring or collar 20 is welded or otherwise fixed to the section A and is engageable by the outer side of the lip 19. The cooperation of the lip 19 with the flange end 15 and the collar 20 holds the sleeve 16 against longitudinal movement relative to the section A so that the cooperation of the threads 17 and 18 accompanying rotation of the sleeve may move the sections A and B toward and away from one another. The sleeve 16 serves to connect the sections A and B and to hold the same against relative lateral shifting and displacement.

The sleeve 16 is provided with means to facilitate its easy rotation. In the construction illustrated the sleeve 16 has a laterally projecting lug 21 provided with an opening 22. The opening 22 is adapted to receive a rod, bar, or the like for turning the sleeve 16. A lateral or radial opening 23 is provided in the sleeve 16 to admit or pass the plate 11 so that the plate may be easily inserted between the opposing ends of the sections A and B. The opening 23 is sufficiently large to freely pass the largest parts of the plate 11.

The plate 11 is adapted to form a closure for the fluid handling openings of the sections A and B to close off the pipe line or conduit and to close or occupy the space between the end surfaces 14 of the sections when the line is to be open. Where the device is employed as an orifice meter fitting the plate 11 may be employed as an orifice plate to control the flow through the pipe line. The plate 11 is an integral member having flat parallel opposite sides. As illustrated in Fig. 2, the plate 11 is an elongate element having two end portions 24 joined by an intermediate reduced web 24ᵃ. The end portions 24 have cylindrically curved margins or peripheries and are proportioned to be readily received between the ends of the sections A and B within the sleeve 16. One end portion 24 is imperforate while the other end portion 24 has a transverse opening 25. In the case illustrated the plate 11 is in the nature of a line blind and the opening 25 is of substantially the same diameter as the openings in the tubular sections A and B, so that it does not interfere with the flow through the sections when arranged in registration with the openings of the sections. As illustrated in Fig. 1 of the drawing one end portion 24 of the plate 11 projects from the device when the other end portion is in position between the ends of the sections A and B.

The sealing means 12 are features of the invention and serve to provide dependable fluid-tight seals between the sections A and B and the opposite surfaces of either portion 24 of the plate 11. The sealing means 12 each comprise two sets of sealing elements or sealing rings 26 and 27 set in the opposite surfaces of the plate 11. One set of rings 26 and 27 is arranged in each plate portion 24 and the rings in one plate portion are in surrounding concentric relation to the opening 25. Pairs or sets of annular grooves 28 and 29 are formed in the opposite faces of the plate 11 to receive the sealing rings 26 and 27, respectively. The grooves 28 and 29 are substantially equal in diameter and, therefore, are back to back. Each groove 28 and 29 has an annular recess in its back wall to provide a lock for its sealing ring and to give the sealing rings thickness or body. In accordance with the invention these recesses are arranged in offset relation so that the plate 11 may be of minimum thickness. The recesses 30 of the grooves 29 occur in the inner corners of the grooves while the recesses 31 of the grooves 28 occur in the outer corners of the grooves so that the recesses 30 and 31 are offset radially, as illustrated in Figs. 1 and 3. The recesses 30 and 31 may have flat walls. The sealing rings 26 and 27 are formed of rubber, synthetic rubber resistant to the action of the fluid handled, or such material combined with fabric or the like. The rings 26 and 27 are continuous or unbroken and are shaped to fit their respective grooves 28 and 29 and to project from the faces of the plate 11. The rings 26 have annular beads or flanges 32 at their peripheries fitting the recesses 31 and the rings 27 have similar flanges 33 at their inner peripheries fitting the recesses 30. The projecting outer faces of the sealing rings 26 and 27 are flat and substantially parallel with the adjacent surfaces of the plate 11 to flatly seal with the surfaces 14 of the body sections A and B. The sealing rings 26 and 27 initially or normally project a substantial distance from the faces of the plate 11 and the projection of the sealing rings is sufficient to allow considerable compression of the rings when the sleeve 16 is rotated to force the surfaces 14 against the rings. This assures tight, effective seals by a mechanical sealing action. The rings 26 and 27 rather closely fit the grooves 28 and 29 and may be cemented or otherwise fixed and sealed in the grooves, if desired.

In accordance with the invention the sealing rings 26 and 27 are formed or shaped to be actuated by fluid pressure in the line when compressed or actuated by mechanical pressure, as described above. The inner peripheries of the rings 26 have annular grooves 34 and the inner peripheries of the rings 27 have similar annular groves 35. The grooves 34 and 35 are preferably V-shaped in cross section leaving tapering annular lips 36 and 37. The sealing lips 36 and 37 occur at the outer faces of the sealing rings 26 and 27 and, therefore, seal with the surfaces 14 through the inherent resiliency of the sealing rings when the latter are compressed by mechanical pressure. The grooves 34 and 35 are open to the fluid passage through the tubular sections A and B. The plate 11 is received between the surfaces 14 with clearance leaving clearance spaces 38. These spaces 38 put the grooves 34 and 35 in communication with the fluid handling passage through the sections A and B. The inner walls of the grooves 29 may slope inwardly to put the grooves 35 in fuller communication with the clearance spaces 38. The fluid pressure admitted to the grooves 34 and 35 by the spaces 38 urges the lips 36 and 37 outwardly against the surfaces 14 to provide effective seals. The fluid pressure in the grooves 34 and 35 also acts inwardly against the sealing rings 26 and 27 so that the rings are held in sealing engagement with the walls of their respective grooves 28 and 29.

It is believed that the operation of the device will be understood from the foregoing detailed description. When it is desired to close off the line the plate 11 is passed through the opening 26 so that its imperforate portion 24 extends across the passage through the sections A and B, as illustrated in Fig. 1. The sleeve 16 is then rotated to move the surfaces 14 toward one another. The sleeve 16 is rotated until the surfaces 14 are in tight compressing engagement with the sealing rings 26 and 27. This engagement provides dependable fluid-tight seals at opposite sides of the plate 11. If fluid pressure is admitted to the interiors of the sections A and B the fluid pressure in the grooves 34 and 35 urges the sealing rings 36 and 37 outwardly to more tightly seal with the surfaces 14. The fluid pressure in the grooves 34 and 35 also aids in holding the rings 26 and 27 in tight sealing engagement with the walls of their grooves 28 and 29. The sealing rings 26 and 27 are maintained in tight sealing cooperation with the surfaces 14 by the mechanical compressing action as well as the action of the fluid pressure in the grooves 34 and 35.

If it is desired to provide for the free passage of fluid through the sections A and B the sleeve 16 is rotated in a direction to move the sections A and B apart. This frees the surfaces 14 from the sealing rings 26 and 27 and the plate 11 may be removed. The plate 11 is turned end for end and passed through the opening 23 to bring the opening 25 in register with the passage through the sections. The sleeve 16 is then rotated to move the shoulders 14 toward one another so that they seal with the rings 26 and 27 as described above. The sealing rings 26 and 27 are easily assembled in their grooves 28 and 29 and when necessary may be easily replaced.

Having described only a typical preferred form and application of my invention, I do not wish to be limited or restricted to the specific details herein set forth, but wish to reserve to myself any variations or modifications that appear to those skilled in the art, or fall within the scope of the following claims.

Having described my invention, I claim:

1. A plate to be installed between two relatively movable members of a fluid handling fitting comprising a plate body having annular grooves in its opposite sides and annular recesses in the back walls of the grooves, the recesses being radially offset, and annular sealing rings seated in the grooves to project from the plate for engagement by the members and having annular flanges on their inner sides fitting the recesses.

2. A plate to be installed between two relatively movable members of a fluid handling fitting comprising a plate body having annular grooves in its opposite sides, and annular recesses in the back walls of the grooves, one recess being larger in diameter than the other so that the recesses are offset, resilient sealing rings in the grooves projecting from the plate to be engaged by the members when the members are moved toward one another, annular sealing lips on the inner margins of the rings actuated against the members by fluid pressure in the members, and flanges on the backs of the rings occupying the recesses.

LELAND S. HAMER.